United States Patent
West, Jr. et al.

(10) Patent No.: US 7,908,518 B2
(45) Date of Patent: Mar. 15, 2011

(54) METHOD, SYSTEM AND COMPUTER PROGRAM PRODUCT FOR FAILURE ANALYSIS IMPLEMENTING AUTOMATED COMPARISON OF MULTIPLE REFERENCE MODELS

(75) Inventors: Patrick M. West, Jr., Hyde Park, NY (US); Vimal M. Kapadia, New York, NY (US); Christopher A. Krygowski, Lagrangeville, NY (US); Timothy J Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/028,039

(22) Filed: Feb. 8, 2008

(65) Prior Publication Data
US 2009/0204924 A1  Aug. 13, 2009

(51) Int. Cl.
*G06F 11/00* (2006.01)
(52) U.S. Cl. ............................................. 714/28; 703/21
(58) Field of Classification Search .................... 714/28, 714/29
See application file for complete search history.

(56) References Cited

U.S. PATENT DOCUMENTS

| 5,493,507 | A | | 2/1996 | Shinde et al. | |
|---|---|---|---|---|---|
| 5,845,064 | A | | 12/1998 | Huggins | |
| 6,810,373 | B1 | * | 10/2004 | Harmon et al. | 703/14 |
| 6,993,469 | B1 | * | 1/2006 | Bortfeld | 703/15 |
| 7,089,174 | B2 | * | 8/2006 | Ishtiaq et al. | 703/22 |
| 7,251,794 | B2 | | 7/2007 | Blanco et al. | |
| 2004/0039966 | A1 | * | 2/2004 | Petsinger et al. | 714/28 |
| 2005/0102640 | A1 | | 5/2005 | Iwamoto et al. | |
| 2005/0289485 | A1 | | 12/2005 | Willis | |
| 2006/0052997 | A1 | * | 3/2006 | Burns et al. | 703/22 |
| 2006/0069541 | A1 | * | 3/2006 | Walacavage et al. | 703/22 |
| 2006/0122817 | A1 | * | 6/2006 | Baumgartner et al. | 703/14 |

FOREIGN PATENT DOCUMENTS

| JP | 59121552 | 7/1984 |
|---|---|---|
| JP | 06309405 | 11/1994 |
| JP | 2005141624 | 6/2005 |
| WO | 2006001335 A1 | 1/2006 |

OTHER PUBLICATIONS z/Architecture Principles of Operation, International Business Machines Corporation, SA22-7832-05, Sixth Edition (Apr. 2007).

* cited by examiner

*Primary Examiner* — Gabriel L Chu
(74) *Attorney, Agent, or Firm* — Cantor Colburn LLP; John Campbell (57) ABSTRACT

System, method and computer program products for failure analysis implementing automated comparison of multiple reference models. An exemplary embodiment includes a method for failure analysis for an instruction set implementation in a computer system, the method including running a test-case in a first and a second model, determining if the test case failed in the first model and determining if the test case failed in the second model.

20 Claims, 4 Drawing Sheets

FIG. 1

| TEST RESULTS | | LIKELY CAUSE OF FAILURE? | | | | |
|---|---|---|---|---|---|---|
| SIMULATION | REFERENCE | HARDWARE IMPLEMENTATION | FIRMWARE IMPLEMENTATION | SIMULATION MODEL | REFERENCE MODEL | TEST-CASE |
| FAIL | FAIL | NO | YES | NO | NO | YES |
| FAIL | PASS | YES | NO | YES | NO | NO |
| PASS | FAIL | NO | NO | NO | YES | NO |
| PASS | PASS | NO | NO | NO | NO | NO |

METHOD, SYSTEM AND COMPUTER PROGRAM PRODUCT FOR FAILURE ANALYSIS IMPLEMENTING AUTOMATED COMPARISON OF MULTIPLE REFERENCE MODELS

BACKGROUND OF THE INVENTION

This invention relates generally to hardware simulation models, and more particularly to providing failure analysis implementing automated comparison of multiple reference models.

Complex computer systems often rely on firmware to implement a portion of the system's design requirements. For example, computer systems with a complex instruction set typically employ a combination of hardware and firmware to implement the instruction set. Instructions which are too complex or too costly to implement in hardware may be implemented in firmware. In addition, firmware can be used to implement many complex system functions, such as interrupt handlers and recovery actions.

To verify that such a system meets the design points, testing of both the hardware and firmware is required. Typically, testing is performed by running "test-cases" in a "Simulation" environment. The simulation model is based on the VHDL, which represents the current state of the hardware implementation. Test-cases, which are run in the simulation environment, include statements to initialize the simulated system and may invoke code routines to run on the simulated hardware. This code often includes firmware which has been delivered to the simulation team. Test-cases also include statements which specify the expected state of the model at the completion of execution. If the final state matches the expectation, the test-case is said to pass; otherwise it is considered a failure. Thus, the simulation environment tests the system as a whole, including both hardware and firmware execution.

A reference model, which emulates hardware behavior, has several advantages over simulation for early firmware development. The reference model environment makes use of a software model of the hardware; this model is intended to conform to the design specifications for the hardware. Since it is only a model of the intended hardware behavior (rather than a model of the actual hardware implementation), this environment can run test-cases much more quickly than a Simulation environment (on the same underlying platform).

Further, a reference model is relatively stable compared to the simulation model. Once the design has been specified, a reference model can be built without waiting for the VHDL to be implemented by logic designers. Unlike the simulation model, the reference model does not need to be updated with each release of the hardware implementation. The reference model only needs to be updated for design changes, design additions, or bug fixes for the model itself.

These advantages make a reference model the test environment of choice for firmware development. Since the model is ready earlier, firmware development can take place in parallel with VHDL development. Once the firmware has been tested in Emulation, it is delivered to the Simulation team for testing with the hardware implementation.

Frequently, simulation discovers aspects of the hardware implementation that place additional requirements on firmware in order to satisfy the design. These implementation specific peculiarities are not known to the reference model because this model is built before the hardware is implemented. Therefore, simulation is required to verify that the components will function together to meet the system design requirements.

During simulation, it can be difficult to quickly determine if a failure is caused by a defect in the test-case, the simulation model, the hardware implementation, or the firmware implementation.

In addition, the reference model may not be compatible with the Simulation test-cases. Further, since the reference model is only used for early firmware testing, it may not be entirely accurate (up to date) in the later stages of simulation. Moreover, in current solutions, comparing the simulation results to a reference model is a time-consuming, manual task, which is prone to human error. Therefore, the reference model is seldom examined during simulation.

BRIEF SUMMARY OF THE INVENTION

An exemplary embodiment includes a method for failure analysis for an instruction set implementation in a computer system, the method including running a test-case in a first and a second model, determining if the test case failed in the first model and determining if the test case failed in the second model.

Another exemplary embodiment includes a computer program product for failure analysis for an instruction set implementation in a computer system, the computer program product including instructions for causing a computer to implement a method, including running a test-case in a first and a second model, determining if the test case failed in the first model and determining if the test case failed in the second model.

A further exemplary embodiment includes a method for failure analysis for an instruction set implementation in the computer system having a display, a graphical user interface and a selection device, the method including retrieving a set of menu entries for a menu on the graphical user interface, the menu entries including a test case in a simulation model and a reference model, displaying the set of menu entries on the display, receiving a menu entry election signal indicative of the selection device pointing at the simulation model menu entry from the set of menu entries, running the test case in the simulation model, receiving a menu entry election signal indicative of the selection device pointing at the reference model menu entry from the set of menu entries and running the test case in the reference model.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides systems and methods implementing multiple reference models to assist in verifying both the hardware and the firmware of a computer system. In an exemplary embodiment, the systems and methods described herein are automated to compare the results from multiple reference models. One or more of the emulation models, which can include varying degrees of abstraction, can be used as reference models. In an exemplary embodiment, at least one of the reference models is based on the Very High Speed Integrated Circuit (VHSIC) Hardware Description Language (VHDL), representing the current state of the hardware implementation. This case, the VHDL-based reference model, can be referred to as the "Simulation" model. This mechanism facilitates more rapidly determining if a test-case failure is caused by a defect in the hardware implementation, the firmware implementation, or the test methodology itself. As discussed above, an exemplary embodiment of the systems and methods described herein implements multiple reference models. In one example, two models: a VHDL-based Simulation model and a reference model, which emulates the hardware behavior, independent of the of the hardware implementation are compatible and capable of running the same test-cases. These test-cases contain directives to initialize the state of the system, execute one or more instructions (including system firmware), and expect final results.

Figure 1:
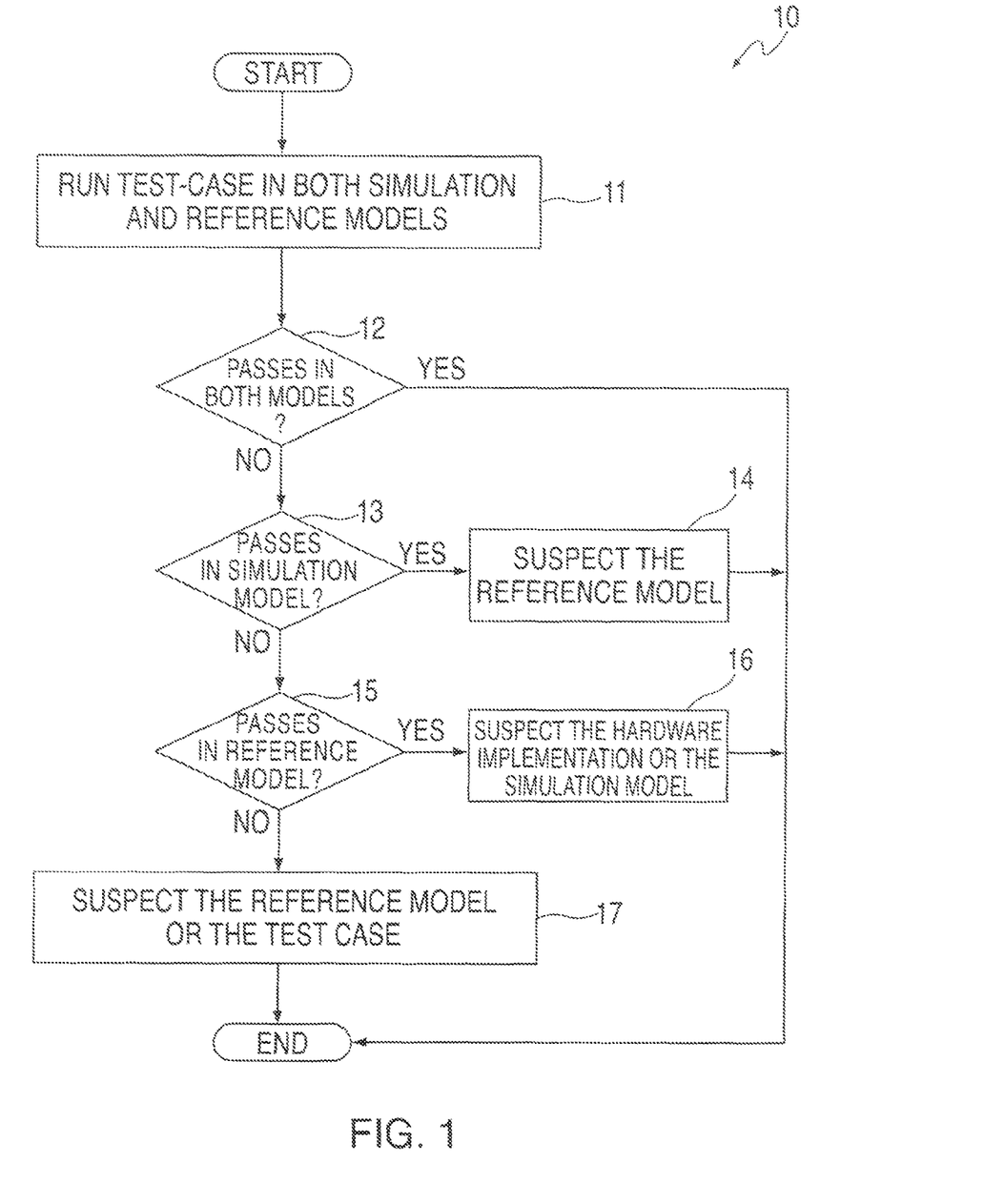
FIG. 1 illustrates a flow chart for a method for providing failure analysis implementing automated comparison of multiple reference models.

FIG. 1 illustrates a flow chart for a method 10 for providing failure analysis implementing automated comparison of multiple reference models. At block 11, an embodiment of the test system can run the test-case in both the simulation model and the reference model. Once these runs are complete, the results are evaluated. At block 12, the test system determines if the test-case passed in both the simulation and reference models. If the test case passes in both models at block 12, the process is complete for the current test-case, and the flow ends. If the test case does not pass in either or both models at block 12, another test is performed, at block 13, to determine if the test-case passed in the simulation model. If the test-case passed in the simulation model at block 13, then at block 14, the system concludes that the suspect failure is in the reference model. If the test-case did not pass in both models but did pass in the simulation model, therefore it can be concluded that the test-case failed in the reference model. Since the hardware and firmware implementations satisfy the test-case expectations, it is more likely that the reference model contains a detect or is unaware of some special interaction between the firmware and the hardware implementation.

If the test at block 13 indicates that the test case did not pass in the Simulation model, a further test is performed at block 15, to determine if the test-case passed in the reference model. If the test-case passed in the reference model at block 15, then at block 16 it is concluded that the suspect failure is in the hardware implementation of the simulation model. From the test at block 12, it is already known that the test-case failed in the simulation model. This information indicates that the firmware implementation and the test-case conform to the design specifications. However, the hardware implementation may contain a defect or require special handling by firmware. It is also possible that the simulation model contains a defect.

If instead, at block 15, the test shows that the test-case failed in the reference model, then at block 17, it is concluded that the test-case fails in the same way in both the simulation model and the reference model. Since the reference model does not rely on the hardware implementation, it tends to indicate that the hardware implementation is not the cause of the failure. Further, since both the simulation model and reference model match, they are likely to be correct. Rather, the failure is likely due to a defect in the firmware implementation or in the test-case itself.

Figure 2:
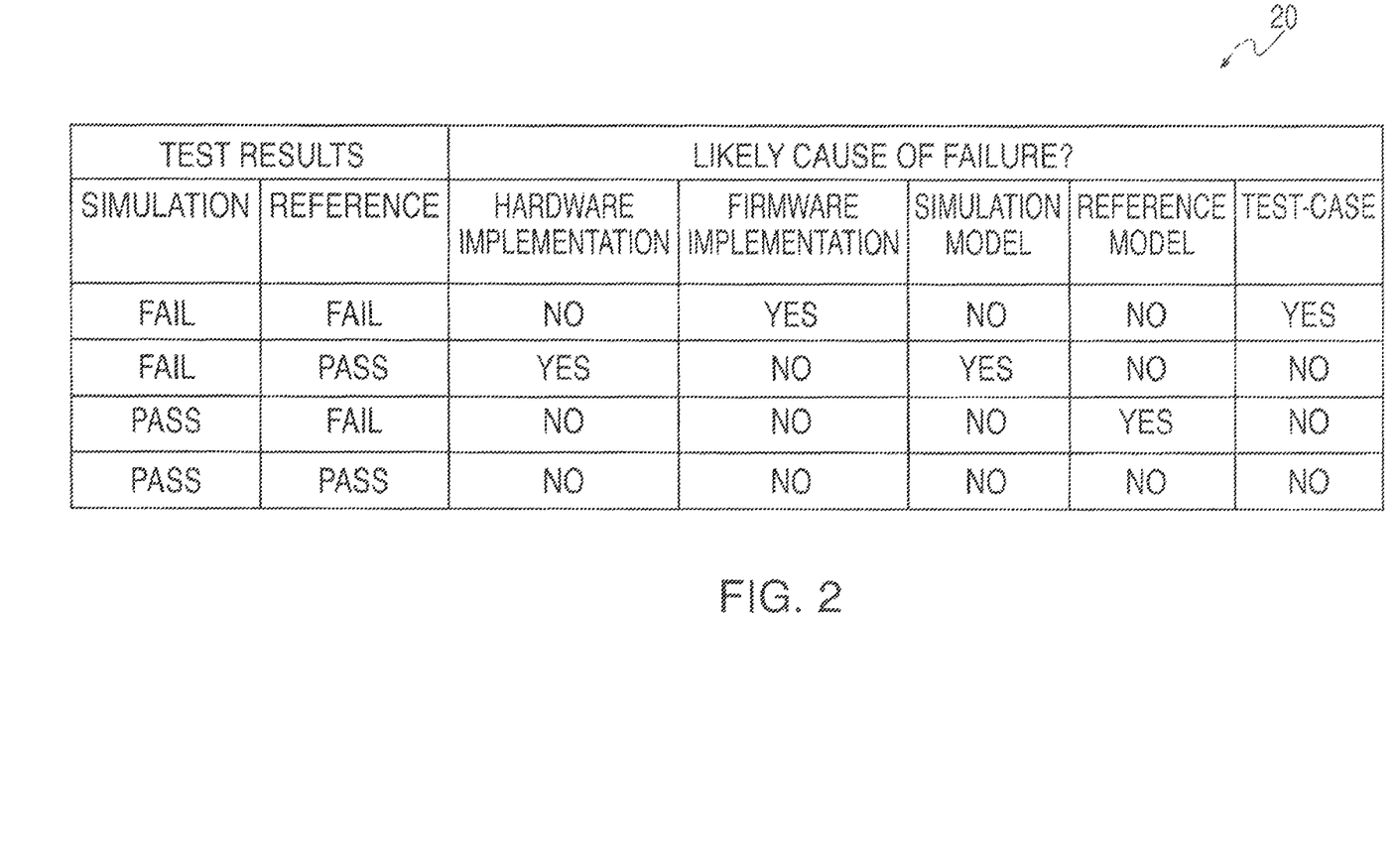
FIG. 2 illustrates a table of a summary of the results of the method 10 of FIG. 1.

FIG. 2 illustrates a table 20 of a summary of the results of the method 10 of FIG. 1. As discussed, the table illustrates the results of whether or not the test-case passed in none, either or both of the simulation and reference models. In an exemplary embodiment, even when a test-case passes in both the simulation model and the reference model, as indicated in the last row of the table 20, the correlation provides a greater level of confidence by indicating that the models match, the expectations in the test-case are sound, and the hardware and firmware implementations produce the desired behavior. In such a case, the design is well understood, and the system implementation satisfies the design.

Figure 3:
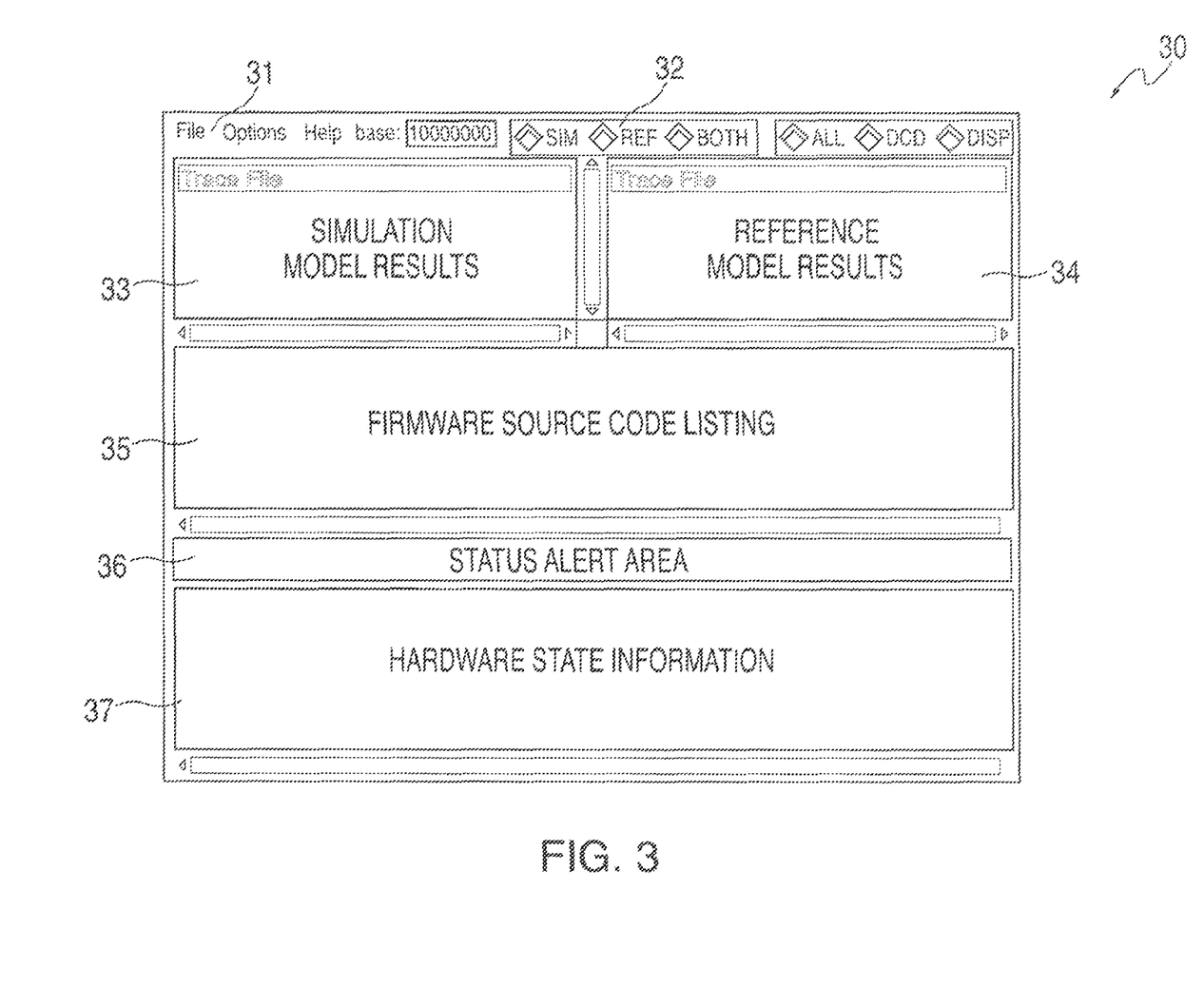
FIG. 3 illustrates the graphical user interface for an implementation based on the method of FIG. 1.

FIG. 3 illustrates the graphical user interface (GUI) 30 for an implementation based on the method 10 of FIG. 1. In an exemplary embodiment, the GUI 30 includes a control window, 31, which includes controls and menus for changing various user settings, such as fonts and colors as is known in the art. The GUI 30 can further include a Status Alert area, 36, which provides brief messages to the user, including a summary of the comparison among the models as discussed herein. In an exemplary embodiment, the GUI can include four major display areas: a simulation model results area 33; a reference model results window 34; a firmware source code listing window 35; and a hardware state information window 37. In an exemplary implementation, the windows 33, 34, 35, 37 can include scrollbars and are re-sizable.

The GUI 30 can further include radio button controls 32, which allow a user to select between the simulation model window 33, the reference model window 34, or both. As shown in FIG. 3, both windows 33, 34 may be displayed side-by-side. In an exemplary embodiment, when the simulation model window 33 is selected, it can be expanded to fill the entire width of the GUI 30, hiding the reference model window 34. Likewise, when the reference model window 34 is selected, the reference model window 34 hides the simulation model window 33.

In an exemplary embodiment, the simulation model results window 33 can display a trace file generated during test-case execution in the simulation model. The trace file is a cycle-by-cycle description of the system state, including the hardware state and Instruction Address (IA), which is an indication of the firmware state. To reduce file size, the trace file may not contain a full description of the state for each cycle. Rather, it may contain an extensive description of the initial state, followed by the incremental changes for each subsequent cycle.

In an exemplary embodiment, the reference model results window 34 can display a trace file generated during the execution of the same test-case in the reference model. The trace file is similar to the trace file from the simulation model. However, since it is a more abstract model, it may contain less detail about the hardware state. The trace file can contain enough detail about the hardware state to describe the hardware interface to firmware, such as register files, interrupts, and other signals that are exposed to firmware. The trace file can also contain the firmware state, the IA.

In an exemplary embodiment a firmware source code listing window 35 can display the firmware source code listing. The listing file can contain the firmware instructions along with the associated addresses in storage. The listing file is a mapping of the source code to the IAs. In an exemplary embodiment, the hardware state information window 37 can display hardware state information, particularly the hardware interface to firmware.

In an exemplary embodiment, the windows 33, 34, 35, 37 are automatically updated to keep them synchronized. For example, in a test-case that passes in both the simulation model and the reference model, both trace files contain the sequence of IAs. Starting with the first cycle in the simulation model trace file, the simulation model results window 33 may be advanced, instruction-by-instruction. Upon each advance, the reference model trace file is also advanced to the same IA, thereby advancing the reference model results window 34. The same IA is located in the firmware source code listing file, and thus the firmware source code listing window 35 is also advanced. In addition, the hardware state information, extracted from the simulation trace file, is updated to present a view of the hardware at the current cycle in the hardware state information window 37.

In an exemplary embodiment, to keep these four windows 33, 34, 35, 37 synchronized, the test-case behaves in the same way in both models, producing the identical sequences of IAs. As with a test-case that passes in both models, a test-case that fails in the same way in both models can also produce identical IA sequences.

In another example, in which a test-case passes in one model, but not the other, at some point, the IA sequences within the trace files may diverge. At the point of divergence, it is not possible to keep the four display areas synchronized. In this case, the reference model results window 34 is not updated; it remains at the last matching IA. Windows 33, 35, and 37 continue to be updated as before. In addition, the status alert area 36 is updated with the message "IA Divergence". As has been described, this point of IA divergence provides useful information for failure analysis.

Figure 4:
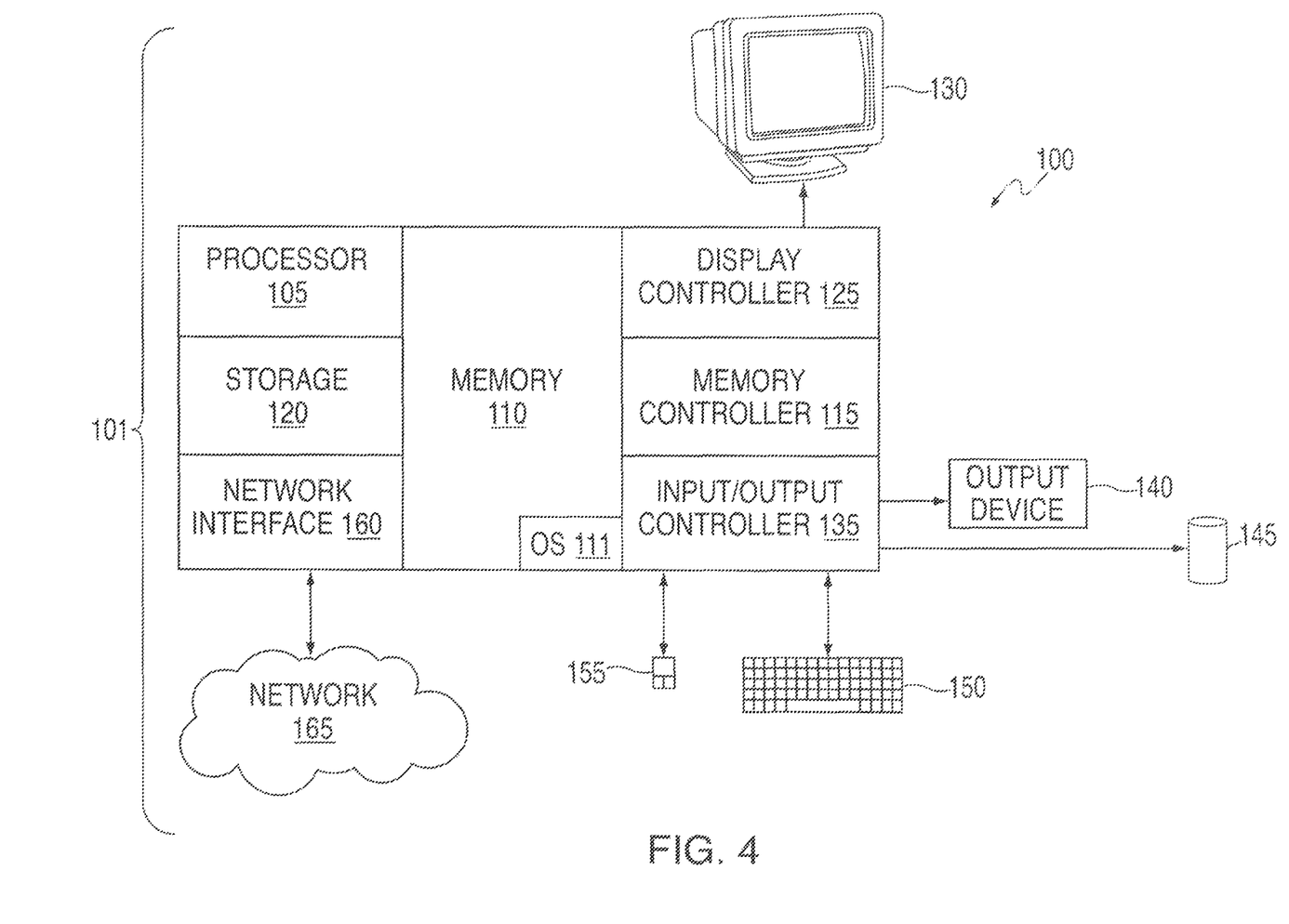
FIG. 4 illustrates an exemplary embodiment of a system for performing failure analysis implementing automated comparison of multiple reference models.

In an exemplary embodiment, the test system as further described with respect to FIG. 4 executes the test-case in both the simulation model and the reference model. The system analyzes the results according to the flow chart of FIG. 1, as described above. The system then displays an appropriate message in the status alert window 36. In an exemplary embodiment, the content of these messages is derived from the method 10 of FIG. 1, as summarized in table 20 of FIG. 2. For example, a message corresponding to the first row in table 20 may read, "Test-case fails in both models; suspect the Firmware Implementation and/or the Test-case itself". A message corresponding to the second row in table 20 may read "Test-case fails in the Simulation model but passes in the Reference model; suspect the Hardware implementation and/or the Simulation Model". A message corresponding to the third row in table 20 may read "Test-case passes in the Simulation model but fails in the Reference model; Investigate Reference Model". A message corresponding to the first row in table 20 may read, "Test-case passes in both models; all is well".

In an exemplary embodiment, the four main display windows 33, 34, 35, 37 are loaded with the test results. In an exemplary embodiment, the simulation model results window 33 is loaded with the trace file, which was generated, during test-case execution in the simulation model, as described above. Likewise, the reference model results window 34 is loaded with the trace file generated during execution of the test case in the reference model. The firmware source code listing window 35 is loaded with firmware source code listing. The hardware state information window 37 is loaded with the hardware state information. In an exemplary embodiment, once the windows 33, 34, 35, 37 have been loaded, an attempt is made to synchronize the windows. A scan is made of the IAs contained in both trace files, and the IA sequences are compared. If the IA sequences are found to be identical (no IA divergence is detected), the trace file loaded in the simulation model results window 33 is advanced to the first IA which was executed. The trace file in the reference model results window 34 is advanced to that same first IA. The firmware source code listing window 35 is advanced to display the source code for the instruction which executed at that cycle. Finally, the hardware state information window 37 is updated to present a view of the hardware at that same cycle.

If, instead, IA divergence is detected during the scan of the trace files (described above), the display is automatically advanced to the point of IA divergence. In an exemplary embodiment, each of the trace files is advanced to the first IA contained within it. Then, if the IAs are identical, each file is advanced to the next IA. This process is repeated until the IAs are found to be different, which is the point of IA divergence. The four main display windows 33, 34, 35, 37 are updated, showing the system state at this point of IA divergence.

FIG. 4 illustrates an exemplary embodiment of a system 100 for performing failure analysts implementing automated comparison of multiple reference models. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 4, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 4, the software in the memory 110 includes the automated comparison methods described herein in accordance with exemplary embodiments and a suitable operating system (OS) 111. For example, the memory 110 includes a process 107 for failure analysis implementing automated comparison of multiple reference models. The operating system 111 essentially controls the execution of other computer programs, such the automated comparison systems and methods described herein, and provides scheduling, input-output control, file and data management, memory management, and communication control and related services.

The automated comparison methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the automated comparison methods can be written as an object oriented programming language, which has classes of data and methods, or a procedure programming language, which has routines, subroutines, and/or functions. The automated methods for performing the failure analysis to compare the results as discussed herein can be implemented in a software programming language, such as java. The implementation may consist of multiple programming modules, each performing one or more steps. These programming modules need not be implemented in the same programming language. Further, this mechanism may be implemented as a standalone tool, or it could be integrated into an existing tool-chain.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interlace card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interlace 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored, in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The automated comparison methods described herein and the OS 111, in whole or in part, but typically the latter, are read by the processor 105, perhaps buffered within the processor 105, and then executed.

When the systems and methods described herein are implemented in software, as is shown in FIG. 4, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The automated comparison methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the automated comparison methods are implemented in hardware, the automated comparison methods described herein can implemented with any or a combination of the following technologies, which are each well known in the art; a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include ensuring that at least one reference model exists for the purpose of emulating the intended hardware behavior, independent of the hardware implementation. Additional technical effects and benefits include ensuring that at least one reference model exists which is based on the VHDL, representing the current state of the hardware implementation. Further technical effects and benefits include ensuring that the reference model is compatible with the simulation model, that is, the reference model is capable of running the same test-cases as the simulation model. The systems and methods described herein further provide an automated comparison of VHDL-based simulation results to the reference model, thereby reducing human error and speeding failure analysis. Additional technical effects and benefits include improving the quality of the reference model by increasing feedback to the model's developer(s).

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for failure analysis for an instruction set implementation in a computer system, the method comprising:
running a test-case in a simulation model and a reference model;
in response to a failure in at least one of the simulation model and the reference model, determining if the test case failed in the simulation model;
in response to a failure in the simulation model, determining if the test case failed in the reference model; and
in response to the test case passing in the simulation model, determining that the reference model is a source of failure for the instruction set.

2. The method as claimed in claim 1 further comprising in response to the test-case passing in the reference model, determining that at least one of a hardware implementation of the instruction set and the simulation model is a source of failure of the instruction set.

3. The method as claimed in claim 1 further comprising in response to the test case failing in the reference model and the test case failing in the simulation model, determining that at least one of a firmware implementation of the instruction set and the test case is a source of a failure of the instruction set.

4. The method as claimed in claim 1 wherein the simulation model tests hardware and firmware execution of the instruction set.

5. The method as claimed in claim 4 wherein the reference model emulates operation of the hardware.

6. The method as claimed in claim 1 further comprising generating simulation and reference model results.

7. The method as claimed in claim 1 further comprising generating firmware a source code listing and a hardware state listing.

8. A computer program product for failure analysis for an instruction set implementation in a computer system, the computer program product including a non-transitory computer readable medium having instructions for causing a computer to implement a method, comprising:
running a test-case in a simulation model and a reference model;
in response to a failure in at least one of the simulation model and the reference model, determining if the test case failed in the simulation model;
in response to a failure in the simulation model, determining if the test case failed in the reference model; and
in response to the test case passing in the simulation model, determining that the reference model is a source of failure for the instruction set.

9. The computer program product as claimed in claim 8 wherein the method further comprises in response to the test-case passing in the reference model, determining that at least one of a hardware implementation of the instruction set and the simulation model is a source of failure of the instruction set.

10. The computer program product as claimed in claim 8 wherein the method further comprises in response to the test case failing in the reference model and the test case failing in the simulation model, determining that at least one of a firmware implementation of the instruction set and the test case is a source of a failure of the instruction set.

11. The computer program product as claimed in claim 8 wherein the simulation model tests hardware and firmware execution of the instruction set.

12. The computer program product as claimed in claim 11 wherein the reference model emulates operation of the hardware.

13. The computer program product as claimed in claim 8 wherein the method further comprises generating simulation and reference model results.

14. The computer program product as claimed in claim 8 wherein the method further comprises generating a firmware source code listing and a hardware state listing.

15. A system for failure analysis for an instruction set implementation, the system comprising:
a processor configured to:
run a test-case in a simulation model and a reference model;
in response to a failure in at least one of the simulation model and the reference model, determine if the test case failed in the simulation model;
in response to a failure in the simulation model, determine if the test case failed in the reference model; and
in response to the test case passing in the simulation model, determine that the reference model is a source of failure for the instruction set.

16. The system as claimed in claim 15 wherein the processor is further configured to in response to the test-case passing in the reference model, determine that at least one of a hardware implementation of the instruction set and the simulation model is a source of failure of the instruction set.

17. The system as claimed in claim 15 wherein the processor is further configured to in response to the test case failing in the reference model and the test case failing in the simulation model, determine that at least one of a firmware implementation of the instruction set and the test case is a source of a failure of the instruction set.

18. The system as claimed in claim 15 wherein the simulation model tests hardware and firmware execution of the instruction set.

19. The system as claimed in claim 18 wherein the reference model emulates operation of the hardware.

20. The system as claimed in claim 15 wherein the processor is further configured to generate simulation model results, reference model results, a firmware source code listing and a hardware state listing.

* * * * *